United States Patent Office 2,888,325
Patented May 26, 1959

2,888,325
METHOD OF MAKING BORON NITRIDE MATERIAL AND BODIES

Kenneth M. Taylor, Lewiston, N.Y., assignor to The Carborundum Company, Niagara Falls, N.Y., a corporation of Delaware No Drawing. Application March 3, 1954
Serial No. 413,969

5 Claims. (Cl. 23—191)

This invention relates to methods of making boron nitride material and boron nitride bodies.

Boron nitride as a material is not new. The literature is replete with suggestive methods for the manufacture of boron nitride as a material. However, until recently it had been a generally accepted fact that boron nitride per se cannot be molded into strong articles of various shapes without the use of an extraneous bonding agent, since attempts to mold the boron nitride alone have invariably resulted in the formation of bodies which were soft and of such low density and strength that they were readily broken or crumbled.

In my copending U.S. patent application Serial No. 288,533, filed May 17, 1952, and now issued as U.S. Patent No. 2,808,314, I disclose methods of making a boron nitride material which can be molded to form hard, dense, strong bodies, which methods comprise heating a mixture of an oxygen-containing boron compound, such as a boric acid, with either an acid-soluble, high-melting, inert material or previously prepared boron nitride in an atmosphere of ammonia to a temperature of 800° C. to 1100° C. for several hours to nitride the boron compound and form boron nitride. The method wherein an acid-soluble material is employed in the raw mix has the decided disadvantage that to recover the boron nitride product, it is necessary to leach the reaction products successively with dilute acid, water and preferably alcohol to remove the acid-soluble material, which does not enter into the nitriding reaction but rather acts as a carrier for the oxygen containing boron compound, and other extraneous material. Similarly, the method wherein previously prepared boron nitride is employed in the raw mix has the decided disadvantage that it involves a preliminary preparation of boron nitride material which can then be used in the raw mix.

Strong, hard dense hot pressed bodies suitable for many uses can be made from boron nitride material, per se, made by the above-described methods. However, despite the tedious recovery procedure in the manufacture of the boron nitride material, the bodies hot pressed therefrom contain about 15–20% alcohol-soluble material, although the bodies were hot pressed in a non-oxidizing inert atmosphere. Because of the high percentage of alcohol-soluble material, these hot pressed boron nitride bodies have very poor resistance to alcohols and water, rapidly disintegrating when submerged in water. As also disclosed in my copending U.S. patent application Serial No. 413,967, filed March 3, 1954, hot pressed boron nitride bodies which are stabilized against attack by water and alcohol can be made from the above-mentioned type of boron nitride material by adding to the raw mixes certain stabilizing additives.

It is an object of the present invention to provide novel methods of making boron nitride materials which methods do not require the preliminary preparation of boron nitride material or a tedious procedure for recovery of the boron nitride product.

It is a further object to provide methods of making stabilized boron nitride materials which methods do not involve making additions to the reaction product.

It is a still further object to provide novel methods of making hot pressed boron nitride bodies.

These and other objects accruing from the present invention will become apparent as the description proceeds.

In accordance with the present invention, boron nitride material is prepared by a multiple stage nitriding process comprising intermittent addition of oxygen-containing boron compound in increments at intermediate stages of nitriding followed by nitriding steps until the desired product is produced. That is, boron nitride is prepared by first nitriding an initial raw mix comprising oxygen-containing boron compound, then adding to the reaction product more oxygen-containing boron compound and further nitriding, followed by similar sequential oxygen-containing boron compound additions and nitriding steps until the desired product is obtained. More specifically, in accordance with the present invention, the method of making boron nitride material comprises performing a first nitriding step on an initial raw mix comprising an oxygen-containing boron compound, such as a boric acid (including anhydrous boric acid), and a diluent by heating the initial raw mix in an atmosphere of ammonia for several hours to form a boron nitride intermediate reaction product, and performing successive similar nitriding steps on intermediate raw mixes comprising intermediate reaction products from the next preceding nitriding steps and additional oxygen-containing boron compound, sufficient nitriding steps being performed to yield a boron nitride reaction end-product comprising boron nitride with a minor amount of diluent. The diluent is a material which under the conditions of nitriding does not fuse or vaporize and is substantially inert to the oxygen-containing boron compound, ammonia and the reaction products. The boron nitride end-product may be used without any purification or recovery steps, inasmuch as by the process of the present invention end-products may be obtained which comprise extremely high percentages of boron nitride.

Where a higher purity boron nitride material is desired, this may be obtained with only a single separation step by using an acid soluble diluent in the initial raw mix and, after the desired number of nitriding steps, leaching the nitride end-product in acid followed by leachings in water and alcohol. An X-ray diffraction pattern of this material shows no lines other than those of boron nitride.

Also in accordance with the present invention, where a stabilized boron nitride material (a boron nitride material which can be hot pressed at temperatures of 1500° C. and above to form bodies which are highly resistant to attack by water and alcohol) is desired the diluent employed in the initial raw mix is a stabilizing diluent which, besides being inert, infusible and unvolatilized under the conditions of nitriding, forms with boric oxide at temperatures of 1500° C. and above a water and alcohol-insoluble material. In my aforementioned patent application I disclose a great many materials which can be added to raw mixes from which boron nitride bodies are hot pressed for stabilizing the molded bodies against attack by water and alcohols. However, although all these materials react with boric oxide at the molding temperatures of 1500° C. and above to form insoluble compounds, not all of them are satisfactory for use as stabilizing agents in the present process because not all of them are inert, infusible and unvolatilized under the conditions of nitriding. The preferred stabilizing diluent for use in the present invention processes is tricalcium phosphate. However, other materials fulfilling the above requirements are also highly satisfactory, with alkaline earth compounds which fulfill these requirements generally being the best stabilizing diluents, and rare earth compounds next most effective. It is believed that various oxides, such as calcium or magnesium oxide, and various phosphates other than tricalcium phosphate, such as magnesium phosphates, are satisfactory as stabilizing diluents.

In the practice of the present invention, the diluent must be present in the initial raw mix in at least sufficient quantity to prevent the mixture from forming a non-porous mass at or below the temperature of nitriding, substantially greater amounts of the diluent being permissible. Usually if about one third by weight of the initial raw mix is diluent the mixture will not become non-porous.

The number of successive nitriding steps which are used depends to a large extent upon the percentage of diluent included in the initial raw mix and the desired percentage of diluent in the nitrided end-product. It also depends to a certain extent upon the treatment of the intermediate products between nitriding steps. In general it has been found that boron nitride material containing about 5 to 10% of the diluent can be made in about six successive nitriding steps when the initial raw mix contains about 50% diluent. If the nitrided product is to be purified by acid treatment, economical considerations determine the number of steps to be used; as few as two nitriding steps may prove most desirable.

The number of successive nitriding steps required to give a boron nitride end-product of specified purity depends to a large extent upon the treatment of the intermediate products between nitriding steps. If the intermediate products are merely mixed with additional oxygen-containing boron compound, after a few nitriding steps the percentage of boron compound nitrided during each step decreases substantially. However, it has been found that if the intermediate product is comminuted to fine particle size before it is mixed with the additional oxygen-containing boron compound, the percentage of boron compound nitrided remains high throughout the successive nitriding steps. It is not necessary to comminute the intermediate product before each nitriding step, relatively satisfactory reaction rates being maintained when the intermediate product is comminuted between every second or third nitriding step. However, for commercial operations it is probably desirable to mill the intermediate reaction product before each nitriding step.

In the practice of the present invention the nitriding steps are preferably carried out within the temperature range of from about 800° C.–1100° C. If the boron nitride is to be purified by an acid treatment to produce high purity boron nitride it is essential that the final nitriding step is not carried out at too low a temperature. If carried out at a temperature below about 800° C. the resulting nitrided product is too soluble in acid and so cannot be purified satisfactorily by the acid treatment because substantial amounts of the boron nitride are hydrolyzed and dissolved in the leaching acid. However, if the boron nitride is to be used in the stabilized unpurified form, all the nitriding steps can be carried on at temperatures lower than 800° C., such as at 700° C. Of course as the temperature is decreased the rate of nitriding decreases and the tendency of the boron nitride so formed to hydrolyze increases. Nevertheless nitriding has been carried out at temperatures as low as about 500° C. A temperature of about 900° C. appears to be the most satisfactory for nitriding in the production of either the stabilized or purified boron nitride materials.

Hot pressed boron nitride bodies may be made in accordance with the present invention by using either the stabilized or the purified boron nitride end-products made in accordance with the above-described processes, by placing the desired amount of boron nitride material in a mold and heating the mold and contents under pressure to form the desired boron nitride body. Best results are obtained with the use of a pressure in the neighborhood of 400 pounds per square inch or higher although articles of satisfactory hardness and strength are obtained by the use of pressures as low as 250 p.s.i. Articles molded at pressures below 250 p.s.i. are considerably softer and of much lower density.

The temperature for hot pressing at which best results are obtained is from about 1500° C. to 1900° C. Bodies pressed at temperatures from 1500° C. to 1800° C. are hard and dense throughout. The sandblast penetration on bodies hot pressed in the range from about 1500° C. to 1800° C. is only about 0.005 to 0.010 of an inch, as compared to the standard penetration of 0.010 of an inch on plate glass, using the same test.

Bodies hot pressed as above described in the temperature range of 1500° C. to 1900° C. and at a pressure of 500 pounds per square inch are white and have an ivory-like appearance and a smooth, graphite-like feel. They are readily machinable and for a ceramic material are quite strong in compression. The compressive strength at room temperature of a representative body is about 40,000 to 50,000 pounds per square inch. The apparent density averages about 2 grams per cc., generally increasing as the molding pressure increases. The bodies have good resistance to oxidation and thermal shock.

To mold stabilized hot pressed boron nitride bodies in accordance with the present invention the stabilized boron nitride material is employed. It should contain from about 5–10% stabilizing diluent, preferably about 10%. Hot pressed bodies made from stabilized boron nitride material containing 10% tricalcium phosphate are highly resistant to alcohol and water, containing only a few percent of alcohol-soluble material and showing no apparent disintegration in water after submersion therein for a sustained period of time. Where the conditions of use of the molded bodies are less exacting, somewhat less than 5% stabilizing diluent in the hot pressed body may be sufficient.

In order that the present invention may be more readily understood, the following example of the preferred practice is given.

An initial raw mix was prepared by intimately mixing 50 grams of a commercial grade of boric acid with 50 grams of a commercial grade of precipitated tricalcium phosphate. The mixture was made into a stiff paste by the addition of approximately 50 ml. of tap water and then pelletized or agglomerated by pressing through a 4-mesh sieve. The resulting small agglomerates of material were dried for two hours at 200° F. followed by drying for three hours at 320° F. The dried pellets were then nitrided by heating in an atmosphere of ammonia in an electric muffle furnace for eight hours at 900° C. The flow of ammonia gas was maintained throughout the nitriding step at a rate of flow of approximately one liter of ammonia per minute per 1200 grams of material.

After the first nitriding step the intermediate product was analyzed for free boric oxide which showed that the intermediate product contained only 0.28% free boric oxide. Approximately 20 grams of boron nitride had been formed.

Next 50 grams of the intermediate product from the first nitriding step were intimately mixed with 50 grams of additional boric acid, and the resultant mixture was passed through a 100 mesh screen. This mixture was then nitrided in accordance with the procedure set forth above for the first nitriding step. Analysis of the intermediate product from this second nitriding step showed that this intermediate product contained only 0.10% free boric oxide.

50 grams of the intermediate product from the second nitriding step was then intimately mixed with 50 grams of additional boric acid, and the resultant mixture was passed through a 100 mesh screen. This mixture was then nitrided as above. The intermediate product from this third nitriding step contained 2.77% free boric oxide.

50 grams of the intermediate product from the third nitriding step was then intimately mixed with 50 grams of additional boric acid and the mixture passed through a 100 mesh screen. This mixture was then nitrided as above. The intermediate product from this fourth nitriding step contained 23.77% free boric oxide. Relatively incomplete nitriding had taken place in this fourth step.

To promote more thorough nitriding in the fifth nitriding step, 50 grams of the intermediate product from the fourth step was milled until the particle size was about 10 microns and finer. This was then mixed with 50 grams of boric acid and nitrided as above. The intermediate product from this fifth nitriding step contained only 0.35% free boric acid.

50 grams of the intermediate product from the fifth nitriding step was then mixed with 50 grams of additional boric acid and the mixture passed through a 100 mesh screen. This mixture was then nitrided as above. The intermediate product from this sixth nitriding step was not analyzed for free boric oxide, it being presumed that the boric oxide content would be relatively low, in view of the results of the previous nitriding steps.

50 grams of the intermediate product from the sixth nitriding step was then mixed with 50 grams of additional boric acid and the mixture passed through a 100 mesh screen. This mixture was then nitrided. The intermediate product from this seventh nitriding step contained 16.51% free boric oxide.

50 grams of the intermediate product from the seventh nitriding step were then milled until the particle size was about 10 microns and finer. It was then mixed with 50 grams of boric acid and nitrided as above. No free boric oxide analysis was run on this eighth nitriding step intermediate product, it being presumed to contain no substantial amount of free boric oxide. The product from the eighth nitriding step was taken as the nitrided end-product of stabilized boron nitride material.

Analysis of this stabilized boron nitride end-product showed it to contain 2.47% calcium which is equivalent to 6.4% tricalcium phosphate. It contained no substantial amount of free boric oxide. This boron nitride end-product therefore comprised essentially boron nitride in a predominant amount with a small amount of tricalcium phosphate stabilizing diluent, namely 6.4%. In appearance the stabilized boron nitride material was a finely divided, bulky, white powder. It had a specific gravity of about 2.21.

While eight nitriding steps were used in the above example, less steps may be used to produce substantially as high a purity stabilized boron nitride material. If the intermediate product from the third and sixth nitriding steps had been milled to fine particle size, more effective nitriding would have taken place during the fourth and seventh steps, thereby decreasing the number of required steps.

Having made a quantity of the powdered stabilized boron nitride material according to the process of the present invention set forth above, small shapes such as cylinders 1¼ inch long and ⅞ inch diameter were made by hot pressing as follows:

An Ajax high frequency electric furnace was used for hot pressing. It had a graphite crucible heating chamber which was cylindrical in form, with an inside diameter of 4 inches and a length of about 11 inches. The top of the crucible during use was closed by a graphite block and powdered carbon except for an opening ½ inch in diameter through which temperature readings were made and an opening through which a graphite mold plunger passed. Since the heating chamber was graphite, the furnace chamber was considered to be in a reducing atmosphere at high temperatures, consisting chiefly of carbon monoxide and nitrogen.

The stabilized boron nitride material was pressed into cylindrical graphite molds. Each mold had two movable graphite plungers. The boron nitride material in loose powdered condition was placed in the mold by compressing slightly as the mold was filled. Pressure was applied to the plungers and maintained throughout the heating and cooling periods. The molding temperature was maintained at the peak level until movement of the plunger ceased, indicating that maximum density of the pressed body had been reached.

Using a molding pressure of about 400 pounds per square inch and heating to a temperature of about 1800° C. the resultant hot pressed stabilized boron nitride body was hard and dense, having a density of about 2.0 grams per cc. Sandblast penetration on this body was about 0.005 to 0.010 of an inch, as compared to the standard penetration of 0.010 of an inch on plate glass using the same test. The body was white and had an ivory-like appearance and a smooth, graphite-like feel. It was readily machinable.

A quantity of the boron nitride material made as above-described was purified by treating it with dilute hydrochloric acid to dissolve the tricalcium phosphate and other extraneous material. The dilute hydrochloric acid was prepared by mixing five liters of concentrated acid and seventeen and one-half liters of water. The material was kept in the hydrochloric acid, with occasional stirring, for eight hours. It was then allowed to stand overnight to settle the undissolved boron nitride, after which the acid solution was decanted off and a mixture of two liters of concentrated hydrochloric acid and ten liters of water added and occasionally stirred for three hours. After standing for a few hours to allow the solids to settle, the acid solution was decanted off. The undissolved boron nitride was washed several times by decantation with tap water and then with distilled water. The solids were filtered on a Buchner funnel, washed several times with hot 95% alcohol and dried overnight at room temperature followed by a final drying at 300° F. for two hours. The high purity boron nitride material was very similar physically to the stabilized boron nitride material, being a finely divided, bulky, white powder. The material had a specific gravity of about 2.21.

Boron nitride bodies were hot pressed from this material by the same procedure as set forth above. The properties of resultant bodies were the same in most respects as those hot pressed from the stabilized boron nitride material, except that they had poor resistance to water and alcohol, containing about 15–20% alcohol-soluble material and readily disintegrating when submerged in water.

The process for making boron nitride material by a plurality of successive nitriding steps without any purification steps between the nitriding steps offers a highly economical method of making large quantities of boron nitride material. Only a relatively small amount of diluent is required. The stabilizing diluent can be an inexpensive and readily available material such as tricalcium phosphate. Boron nitride material containing a relatively high percentage of boron nitride can be made without any purification step whatsoever, which boron nitride may be in a stabilized condition. Still higher purity boron nitride material can be made with only a single purification step which requires only a small amount of acid.

Besides being useful as raw mixes for making hot pressed bodies, the boron nitride material made in accordance with the present invention can be used in loose granular form as high temperature insulation where oxidizing conditions are not encountered. Because of its graphite like crystal structure it is also useful as a lubricant, particularly where high temperatures are encountered. Furthermore, it can be used as an anti-sticking agent in the making of glass beads and the like. Also in accordance with this invention hot pressed boron nitride bodies may be made which are suitable for uses such as high temperature bearings, rocket motor combustion chamber and exhaust nozzle linings, high temperature crucibles and other refractory articles, various types of electrical insulators and the like.

Having described the invention in detail, it is desired to claim:

1. The method of making boron nitride material which comprises (1) mixing an oxygen-containing boron compound with an inert diluent comprising an inorganic alkaline earth compound which is infusible and unvolatilized under the conditions of nitriding, the amount of diluent being at least sufficient to prevent the mixture from forming an on-porous mass at the temperature of nitriding, (2) heating said mixture in an atmosphere of ammonia at a temperature of 700° C. to 1100° C. to nitride the oxygen-containing boron compound and form boron nitride, (3) mixing additional oxygen-containing boron compound with the whole product resulting from the preceding step (2), and repeating said steps (2) and (3) until a boron nitride product containing less than 10% of diluent is obtained.

2. The method of making boron nitride material in accordance with claim 1 in which the reaction product from the final nitriding step is leached in dilute acid, water and alcohol to yield a high purity boron nitride material.

3. The method of making boron nitride material in accordance with claim 1 in which the reaction product of one nitriding step is comminuted to fine particle size before being mixed with additional oxygen-containing boron compound to form the raw mix for the next nitriding step.

4. The method of making water- and alcohol-stabilized boron nitride bodies which comprises (1) mixing an oxygen-containing boron compound with an inert diluent comprising an inorganic alkaline earth compound which is infusible and unvolatilized under the conditions of nitriding, the amount of diluent being at least sufficient to prevent the mixture from forming a non-porous mass at the temperature of nitriding, (2) heating said mixture in an atmosphere of ammonia at a temperature of 700° C. to 1100° C. to nitride the oxygen-containing boron compound and form boron nitride, (3) mixing additional oxygen-containing boron compound with the whole product resulting from the preceding step (2), repeating said steps (2) and (3) until a boron nitride product containing less than 10% of diluent is obtained, and introducing the resulting boron nitride product into a mold and heating the mold and contents under pressure to a temperature of from 1500° C. to 1900° C. to form the desired boron nitride body.

5. The method of making boron nitride bodies in accordance with claim 4 in which the reaction product of one nitriding step is comminuted to fine particle size before being mixed with additional oxygen-containing boron compound to form the raw mix for the next nitriding step.

References Cited in the file of this patent

UNITED STATES PATENTS

| | | |
|---|---|---|
| 1,157,271 | Weintraub | Oct. 19, 1915 |
| 2,089,030 | Kratky | Aug. 3, 1937 |

FOREIGN PATENTS

| | | |
|---|---|---|
| 12,377 | Great Britain | Jan. 22, 1913 |
| 282,701 | Germany | Mar. 16, 1915 |
| 483,201 | Great Britain | Apr. 13, 1938 |

OTHER REFERENCES

"Boron Nitride—An Unusual Refractory," Finlay and Fetterley, American Ceramic Society Bulletin, vol. 31, page 142.